United States Patent
Fisher et al.

(10) Patent No.: US 11,376,661 B2
(45) Date of Patent: Jul. 5, 2022

(54) APPARATUS AND METHODS FOR IMPROVEMENT OF SURFACE GEOMETRIES OF INTERNAL CHANNELS OF ADDITIVELY MANUFACTURED COMPONENTS

(71) Applicant: UNITED TECHNOLOGIES CORPORATION, Farmington, CT (US)

(72) Inventors: Brian A. Fisher, West Hartford, CT (US); David W. Morganson, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 320 days.

(21) Appl. No.: 16/433,727

(22) Filed: Jun. 6, 2019

(65) Prior Publication Data
US 2020/0384539 A1 Dec. 10, 2020

(51) Int. Cl.
*B22F 3/24* (2006.01)
*B22F 5/00* (2006.01)
(Continued)

(52) U.S. Cl.
CPC ............. *B22F 3/24* (2013.01); *B22F 5/009* (2013.01); *B24B 19/14* (2013.01); *B24C 1/00* (2013.01); *B24C 1/04* (2013.01); *B24C 3/00* (2013.01); *B24C 3/10* (2013.01); *B24C 3/16* (2013.01); *B24C 3/325* (2013.01); *B33Y 40/20* (2020.01); *B22F 2003/247* (2013.01)

(58) Field of Classification Search
CPC ....... B24B 19/014; B24B 29/06; B24B 29/08; B24C 1/04; B24C 3/325; B24C 3/16; B08B 9/327; B08B 9/057; B08B 9/0553; B08B 9/0552; F41A 29/02; B22F 3/24; B22F 2003/247
USPC ................ 15/104.061; 134/8; 166 C; 451/76
See application file for complete search history.

(56) References Cited

U.S. PATENT DOCUMENTS 2,794,197 A * 6/1957 Crane ..................... E03F 9/002
15/104.061
3,835,587 A * 9/1974 Hall, Jr. .................. B24C 3/325
451/38
(Continued)

FOREIGN PATENT DOCUMENTS

EP 3170568 5/2017
EP 3192599 7/2017
(Continued)

OTHER PUBLICATIONS

European Patent Office, European Search Report dated Sep. 11, 2020 in Application No. 20178284.4.

*Primary Examiner* — Joel D Crandall
(74) *Attorney, Agent, or Firm* — Snell & Wilmer L.L.P.

(57) ABSTRACT

A cutting system for removing an excess material along a length of a channel constructed using an additive manufacturing process is disclosed. In various embodiments, the cutting system includes a cutting component having an abrasive surface configured to remove the excess material along a down-facing surface of the channel and a smooth surface configured for sliding contact with an up-facing surface of the channel; and a motive component configured to urge the cutting component through the channel.

16 Claims, 9 Drawing Sheets

(51) Int. Cl.
*B24C 3/16* (2006.01)
*B24C 3/10* (2006.01)
*B24C 3/00* (2006.01)
*B24C 1/00* (2006.01)
*B24C 3/32* (2006.01)
*B24C 1/04* (2006.01)
*B24B 19/14* (2006.01)
*B33Y 40/20* (2020.01)

(56) References Cited

U.S. PATENT DOCUMENTS

| | | | | |
|---|---|---|---|---|
| 4,380,477 | A | * | 4/1983 | Saunders ............... B24C 5/02 |
| | | | | 134/7 |
| 4,406,031 | A | * | 9/1983 | Eimer .................. B08B 9/0552 |
| | | | | 15/104.061 |
| 6,135,129 | A | * | 10/2000 | Akazawa ............. B08B 9/0436 |
| | | | | 134/8 |
| 10,220,444 | B2 | | 3/2019 | Ott et al. |
| 2012/0060298 | A1 | | 3/2012 | Campbell |
| 2015/0285578 | A1 | * | 10/2015 | Hwang ................ F41A 29/02 |
| | | | | 42/95 |
| 2016/0228975 | A1 | | 8/2016 | Blackmore |
| 2017/0197284 | A1 | | 7/2017 | Twelves, Jr. et al. |
| 2019/0134779 | A1 | | 5/2019 | Kawasumi et al. |

FOREIGN PATENT DOCUMENTS

| | | |
|---|---|---|
| EP | 3199269 | 8/2017 |
| EP | 3219418 | 9/2017 |
| GB | 2517490 | 2/2015 |

\* cited by examiner

APPARATUS AND METHODS FOR IMPROVEMENT OF SURFACE GEOMETRIES OF INTERNAL CHANNELS OF ADDITIVELY MANUFACTURED COMPONENTS

FIELD

The present disclosure relates generally to apparatus and methods used to finish internal portions of additively manufactured components and, more particularly, to apparatus and methods used to smooth down-facing surfaces of channels or passageways extending through additively manufactured components.

BACKGROUND

Additive manufacturing processes and techniques enable fabrication of components having geometries that are difficult or otherwise impossible to make using other fabrication techniques. For example, components in gas turbine engines may include complex arrays of internal channels for conveying coolants or lubricants that are difficult or impossible to fabricate using more conventional fabrication techniques, such as casting or molding techniques. Additive manufacturing techniques and related advances facilitate formation of such channels having complex geometries or high-aspect ratios (e.g., channels where the ratio of channel length to a characteristic cross sectional dimension is large). However, because of limitations inherent in the additive manufacturing process, and even in other fabrication processes, various internal surfaces of these channels may exhibit distortions or surface roughness following fabrication. For example, down-facing surfaces of circular or similarly shaped channels may include undesirable distortions or surface roughness resulting from material property variations in the vicinity of the weld pool that occur while generating the overhanging surface (i.e., the down-facing surface) of the channel. Left unimproved, these regions of undesirable distortion or surface roughness have the potential to interfere with fluid flow through the channels of the component when used in operation.

SUMMARY

A cutting system for removing an excess material along a length of a channel constructed using an additive manufacturing process is disclosed. In various embodiments, the cutting system includes a cutting component having an abrasive surface configured to remove the excess material along a down-facing surface of the channel resulting from the additive manufacturing process and a smooth surface configured for sliding contact with an up-facing surface of the channel resulting from the additive manufacturing process; and a motive component configured to urge the cutting component through the channel.

In various embodiments, the cutting component comprises a first cutter body. In various embodiments, the cutting component comprises a plurality of cutter bodies, including the first cutter body, a second cutter body and a third cutter body. In various embodiments, the first cutter body defines a first diameter, the second cutter body defines a second diameter and the third cutter body defines a third diameter, the first diameter being less than the second diameter. In various embodiments, the motive component is a cable configured to draw the first cutter body, the second cutter body and the third cutter body through the channel.

In various embodiments, the cutting component comprises a first plurality of cutter bodies defining a first diameter and a second plurality of cutter bodies defining a second diameter having a value greater than the first diameter. In various embodiments, the cutting component comprises a tube. In various embodiments, the tube comprises a plurality of lobes. In various embodiments, the cutting component comprises a cutter body having a non-circular cross section. In various embodiments, the cutting component is a tapered cutter.

A cutting system for removing an excess material along a length of a channel constructed using an additive manufacturing process is disclosed. In various embodiments, the cutting system includes a cutting component having a first means configured to remove the excess material along a down-facing surface of the channel resulting from the additive manufacturing process and a second means configured for sliding contact of the cutting component with an up-facing surface of the channel resulting from the additive manufacturing process; and a motive component configured to urge the cutting component through the channel.

In various embodiments, the first means includes a rough surface configured to remove the excess material and the second means includes a smooth surface configured to slide along the up-facing surface of the channel. In various embodiments, the cutting component includes a cutter body. In various embodiments, the cutting component includes a plurality of cutter bodies.

In various embodiments, the first means includes an abrasive media supply orifice extending through a first surface of a cutter body and connected to a media supply tube configured to supply an abrasive media. In various embodiments, the second means includes a lubricant supply orifice extending through a second surface of the cutter body and connected to a lubricant supply tube. In various embodiments, a seal is configured to slide along an interior surface of the channel between the down-facing surface and the up-facing surface to prevent the abrasive media from flowing into a region bounded by the seal and the second surface of the cutter body.

A method of removing excess material along a down-facing surface of a channel constructed using an additive manufacturing process is disclosed. In various embodiments, the method includes the steps of: disposing within the channel a cutting component having a rough surface configured to abrade the excess material and a smooth surface configured to slide along an up-facing surface of the channel; and urging the cutting component along a length of the channel using the up-facing surface of the channel as a guide for the cutting component. In various embodiments, the cutting component includes a cutter body. In various embodiments, the cutter body includes at least one of a sphere, a spheroid, a cylinder, or an axisymmetric body of revolution.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
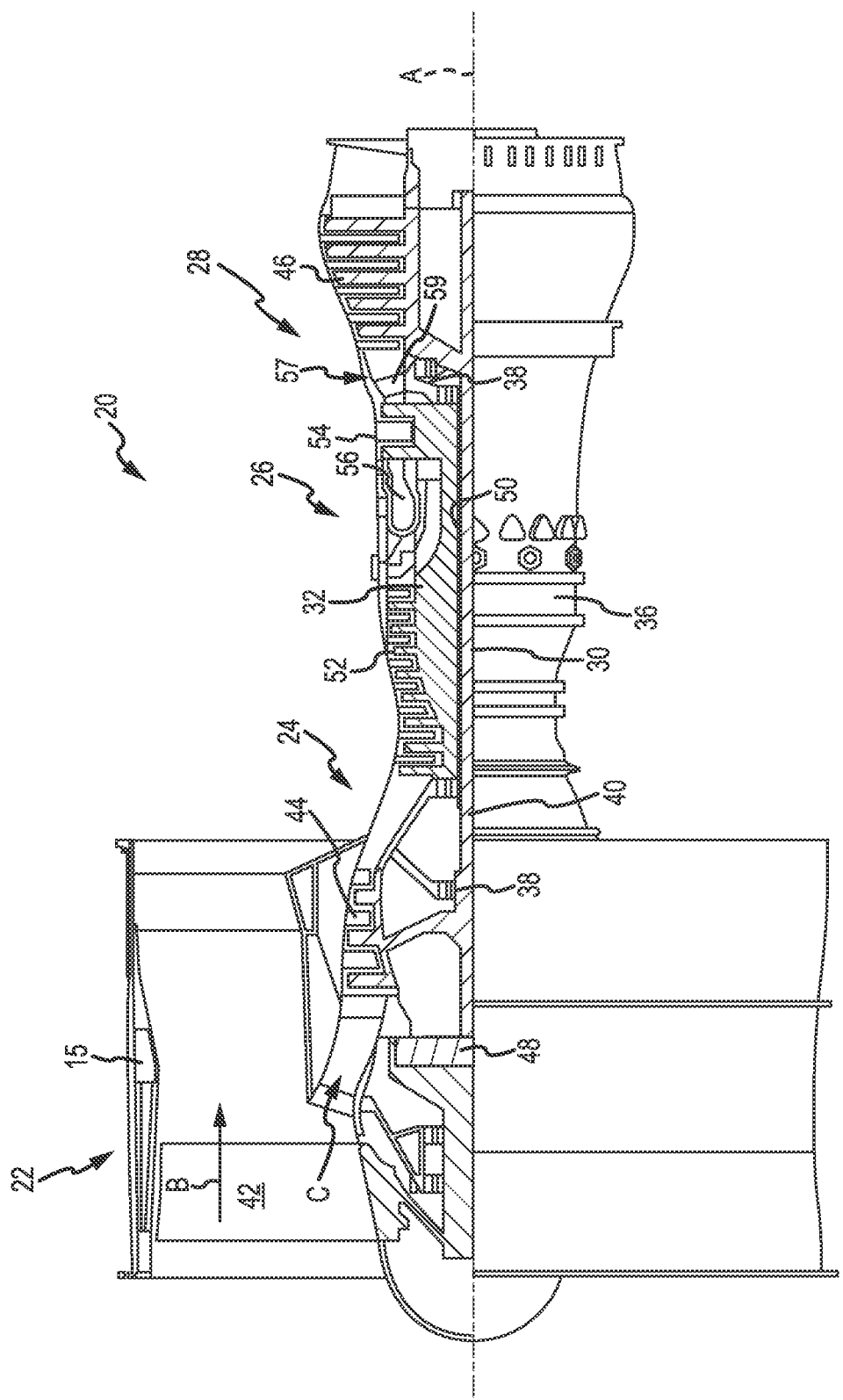
FIG. 1 is a cross sectional schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core or primary flow path C for compression and communication into the combustor section 26 and then expansion through the turbine section 28. Although depicted as a two-spool turbofan gas turbine engine in the disclosed non-limiting embodiment, the concepts described herein are not limited to use with two-spool turbofans as the teachings may be applied to other types of turbine engines.

The gas turbine engine 20 generally includes a low speed spool 30 and a high speed spool 32 mounted for rotation about an engine central longitudinal axis A (with the arrow pointing in the aft direction) relative to an engine static structure 36 via several bearing systems 38. Various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and the low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Various components of the gas turbine engine 20 include conduits, channels or passageways extending through the component or a portion thereof. For example, components in the gas turbine engine 20 may include internal channels for conveying a coolant. Such components include, for example, the blades and the stators that comprise the compressor and turbine sections described above. Such components may also comprise internal channels for conveying bleed air from the compressor to other areas of the gas turbine engine 20 benefitting from a source of high-pressure cooling fluid. Other components comprising conduits, channels or passageways include the lubrication system, where lubricants are delivered from a pump to bearings and the like. Many of these various components are constructed using additive manufacturing techniques and include conduits, channels or passageways having curved or straight portions or combinations thereof with an internal surface having undesirable roughness or distortion, particularly along a length of a down-facing surface, following the additive manufacturing process.

Figure 2A:
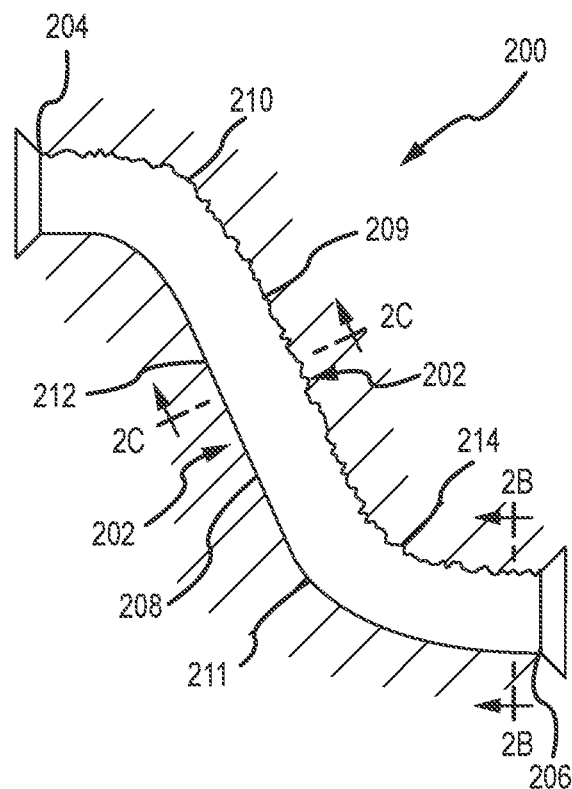
FIG. 2A is a cross sectional schematic view of a channel extending through the interior of an additively manufactured part, in accordance with various embodiments.

Referring now to FIG. 2A, a component 200, fabricated through additive manufacture, is illustrated. The component 200 includes a channel 202 (e.g., an internal channel, conduit or passageway) extending from a first end 204 to a second end 206. The channel 202 is defined by an inner surface 208 that, in various embodiments, is generally circular in cross section from the first end 204 to the second end 206. As illustrated, the inner surface 208 of the channel 202 may be characterized by an undesirable degree of surface roughness along a down-facing surface 209 and an acceptable degree of surface roughness along an up-facing surface 211 following initial fabrication through additive manufacture. To be clear, a down-facing surface refers to a surface of overhang fabricated during the additive manufacturing process, while an up-facing surface refers to a surface of little to no overhang fabricated during the additive manufacturing process. Thus, while a down-facing surface may, in fact, face down—e.g., toward a floor or a base of an additive manufacturing machine—during the additive manufacturing process, the same is not necessarily the case during a post-processing operation where the part may be rotated in an arbitrary direction prior to post-processing or cutting or smoothing as described in detail below.

In various embodiments, the channel 202 is curved at one or more portions along a length defined by an arc-length distance from the first end 204 to the second end 206. As illustrated, for example, the channel 202, in various embodiments, includes a first curved portion 210 downstream (or upstream) of the first end 204, followed by a substantially straight portion 212, and then followed by a second curved portion 214 upstream (or downstream) of the second end 206. In various embodiments, the first curved portion 210 may be characterized such that a line of sight does not exist between the location of the channel 202 where the first curved portion 210 commences and the location of the channel 202 where the first curved portion 210 terminates or where the substantially straight portion 212 commences. A similar characterization applies to the second curved portion 214 or any additional curved portions that may be present in a passageway. The disclosure that follows provides, among other things, apparatus and methods to reduce the surface roughness of the channel 202 within the component 200, or other components having a various numbers of curved or straight passageways. More particularly, the disclosure provides apparatus and methods useful in smoothing distortions or surface roughness along the down-facing surface 209 of the channel 202 using the up-facing surface 211 as a support surface or guide. While the disclosure contemplates smoothing distortions as described above, it is noted that the apparatus and methods described herein may, in various embodiments, be used as a precursor step to subsequent finishing steps that are not typically focused on preferential removal of material from relatively rough, down-facing surfaces. Accordingly, in various embodiments, such a precursor step may be necessary or prove beneficial to the application of subsequent finishing steps where a final channel geometry (including surface smoothness) is achieved with as little subsequent finishing as possible. Further, because subsequent finishing steps typically do not remove material preferentially, there exist certain geometries that require or at least greatly benefit from application of the apparatus and methods described herein as a precursor step to subsequent finishing steps.

Figures 2B, 2C:
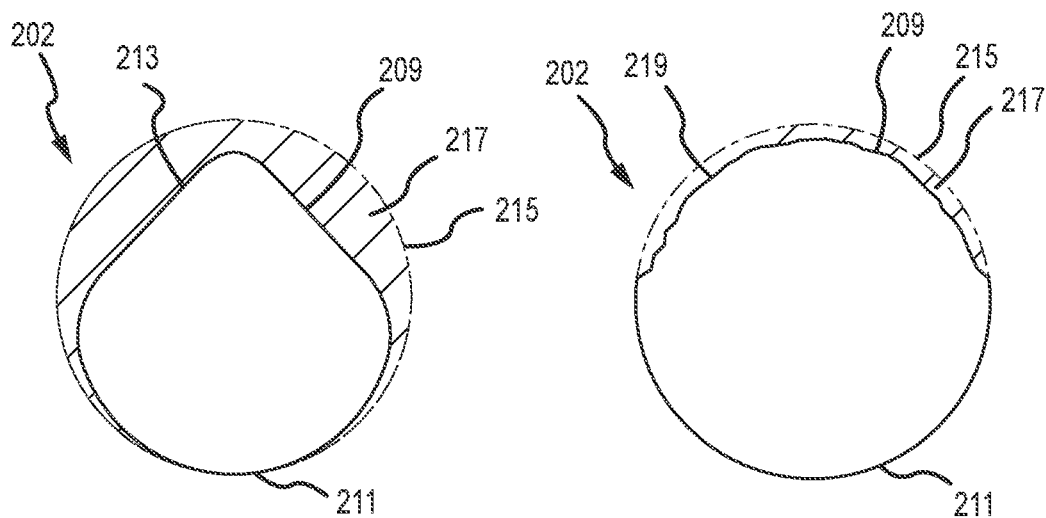
FIGS. 2B and 2C are cross sectional views of the channel illustrated in FIG. 2A, in accordance with various embodiments.

Referring now to FIGS. 2B and 2C, various portions of the down-facing surface 209 and the up-facing surface 211 depicted in FIG. 2A are illustrated schematically in cross section. For example, referring to FIG. 2B, a cross section of the channel 202, including the down-facing surface 209 and the up-facing surface 211, is shown proximate the second end 206. As illustrated, the down-facing surface 209 includes a tear drop surface 213 introduced through the additive manufacturing process. The tear drop surface 213 provides less overhang (or less unsupported downward facing surface) during the additive manufacturing process, so is less prone to developing undesirable surface roughness or is less likely to result in a failed process due to poor melting or improper function of a powder spreading mechanism. Nevertheless, in order to develop a circular cross sectional shape 215 intended for the channel 202 in finished form, an excess material 217 (or a region of excess material) between the tear drop surface 213 and the circular cross sectional shape 215 desired in the final component must be removed. Similarly, referring to FIG. 2C, a cross section of the channel 202, including the down-facing surface 209 and the up-facing surface 211, is shown proximate the substantially straight portion 212. As illustrated, the down-facing surface 209 includes a rough surface 219 introduced through the additive manufacturing process at an overhanging section of the circular cross sectional shape 215 intended for the channel 202 in finished form. While the rough surface 219 more closely approximates the circular cross sectional shape 215 than does the tear drop surface 213, the excess material 217 between the rough surface 219 and the circular cross sectional shape 215 must be removed in order to develop the circular cross sectional shape 215 intended for the channel 202 in finished form. Further, while only the rough surface 219 and the tear drop surface 213 are described above, the disclosure contemplates other surfaces or regions of the channel 202 defining undesirable distortions (whether or not intentionally placed) or regions of undesirable surface roughness (e.g., where a rough surface 219 extends along the tear drop surface 213 or some other down-facing surface) or various combinations thereof. In various embodiments, the up-facing surface 211 is characterized by a surface roughness substantially less than that of the down-facing surface 209, thereby enabling the up-facing surface 211 to serve as a stabilizing platform for guiding a cutter through the channel 202, the cutter being configured to remove the excess material 217 along a length of the channel 202.

Figure 3A:
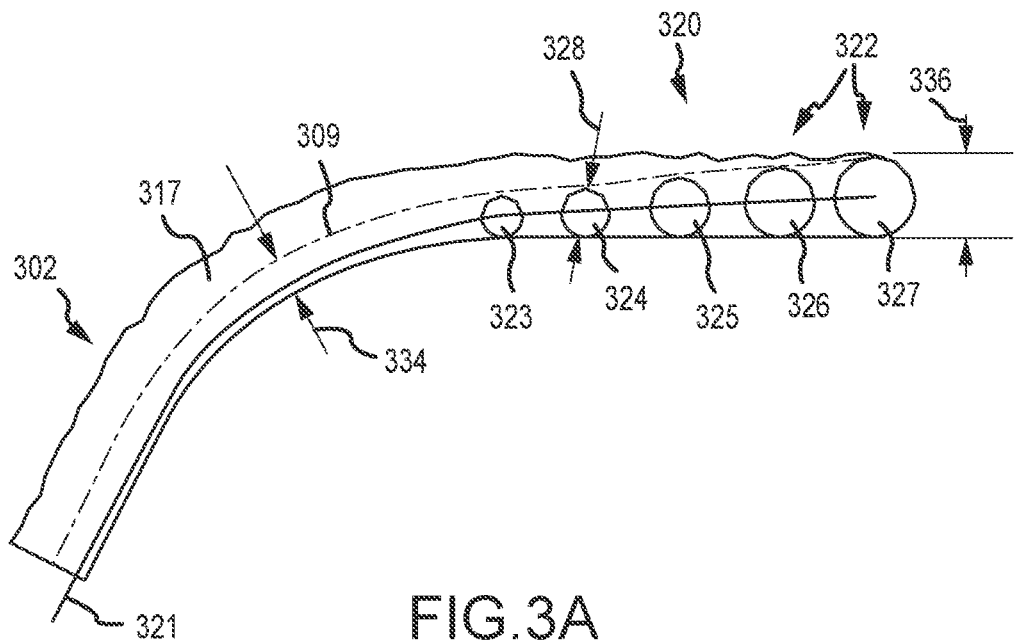
FIGS. 3A, 3B and 3C illustrate a cutting system configured to smooth a surface of a channel exhibiting distortions or surface roughness, in accordance with various embodiments.
Figure 3B:
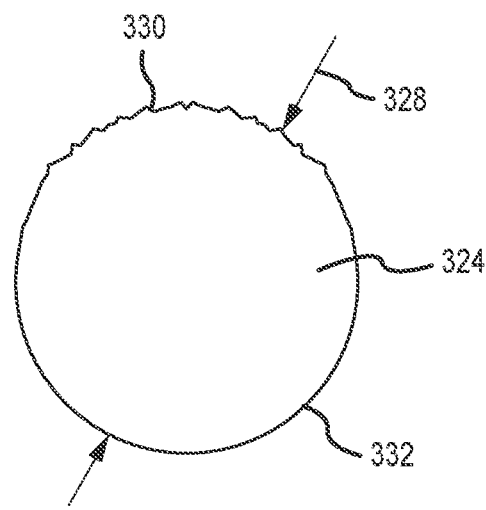
Figure 3C:
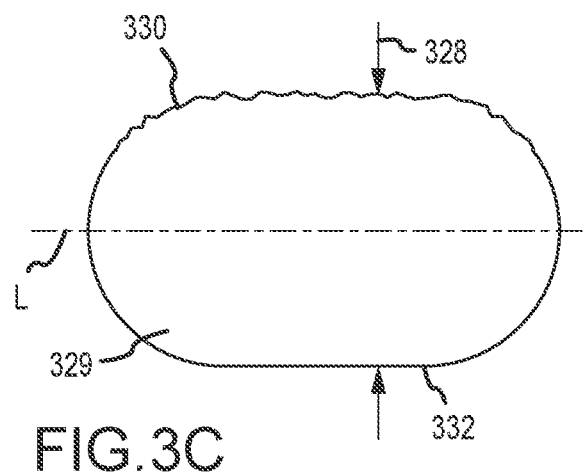

Referring now to FIGS. 3A, 3B and 3C, a cutting system 320, configured to remove excess material 317 along a length of a channel 302, such as, for example, the excess material 217 along the length of the channel 202 described above with reference to FIGS. 2A-2C, is illustrated. In various embodiments, the cutting system 320 includes a cutting component, such as, for example, a plurality of cutter bodies 322, including, for example, a first cutter body 323, a second cutter body 324, a third cutter body 325, a fourth cutter body 326 and a fifth cutter body 327. Each of the plurality of cutter bodies 322 is characterized by a cross sectional dimension $D_{CS}$, such as, for example, a second diameter 328 of the second cutter body 324. The cross sectional dimension $D_{CS}$ may be consistent with, for example, a sphere or sphere-like body, as illustrated in FIGS. 3A and 3B, or an elongate body 329 having a longitudinal axis L, such as, for example, a spheroid (or a prolate spheroid) or a cylinder-like body having rounded ends as illustrated in FIG. 3C (which will share a similar cross sectional profile as the sphere-like body illustrated in FIG. 3B). In various embodiments, the diameter D may be defined as an average diameter $D_{avg}$ that accounts for variations in diameter D across a rough surface 330 (or an abrasive surface) and the diameter D across a smooth surface 332 that define the cutter body (e.g., the second cutter body 324). For example, in various embodiments, the average diameter $D_{avg}$ of the rough surface 330 may be defined as the mean between a maximum diameter—e.g., a diameter that takes into account the peaks of the surface roughness extending outward from the rough surface 330—and a minimum diameter—e.g., a diameter that takes into account the troughs of the surface roughness extending inward from the rough surface 330. Further, in various embodiments, where the cutter body has a varying diameter along its longitudinal length, the diameter D may be defined as the average diameter (as defined above) taken at the location of maximum diameter along the longitudinal axis. Accordingly, it is noted here that use of the term "cutter body" throughout this disclosure does not imply the cutter body is perfectly round, spherical, spheroidal, cylindrical, axisymmetric body of revolution or the like (all of which are contemplated by the disclosure), but, rather, implies there may include roughness over at least a portion of the surface of the cutter body, with the roughness on such portion generally intended to smooth, cut or otherwise remove the excess material 317 along the length of the channel 302. In various embodiments, a cable 321 connects each of the plurality of cutter bodies 322 and is configured to pull the plurality of cutter bodies 322 through the channel 302 during the smoothing or cutting process. While the disclosure describes a cable configured to draw the plurality of cutter bodies through the channel, the disclosure contemplates other embodiments of such motive component configured to urge the cutting component(s) through the channel, such as, for example, a shaft or a rod configured to push the plurality of cutter bodies through the channel. Further, in various embodiments, the motive component—e.g., the cable 321—is configured to transmit a torque or be otherwise resistant to twist such that, for example, the abrasive surface may be remotely guided to the surface within the channel being abraded.

Still referring to FIGS. 3A and 3B, the plurality of cutter bodies 322 comprises a progression of cutter bodies, each cutter body in the progression having a progressively larger diameter $D_i$, such that $D_1<D_2<D_3<D_4<D_5$, where $D_1$ is a first diameter of the first cutter body 323, $D_3$ is a third diameter of a third cutter body, and $D_5$ is the fifth diameter of the fifth cutter body 327 (or, generally, $D_i$ is the i-th diameter of an i-th cutter body). In various embodiments, $D_1$ is selected to begin cutting into a down-facing surface 309 that remains following an additive manufacturing process and that is characterized by a first characteristic distance 334 (which may characterize a tear drop shape, a circular shape or some other shape having a down-facing surface), and $D_5$ is selected to bring the diameter of the channel 302 that results from the cutting process to its intended value 336 following the cutting process. Generally speaking, in various embodiments, the rough surface 330 is used to cut away the excess material 317 along the down-facing surface 309 while the smooth surface 332 is used to guide each cutter body along the corresponding up-facing surface. In various embodiments, each of the progressively larger cutter bodies may define a difference in diameter, $\Delta D_i = D_i - D_{i-1}$. Depending upon the application, $\Delta D_i$ or $D_i$ may take on any appropriate value, which, in various embodiments, may range from values on the order of a few micrometers or less to several hundred millimeters or more. In various embodiments, each of the cutter bodies comprises a metallic composition having a hardness—e.g., a hardness measured by a Rockwell or Brinell scale—that is harder than the material surrounding the channel 302. In various embodiments, each of the cutter bodies comprises an abrasion resistant material having a degree of compliance, such as, for example, polytetrafluoroethylene ("PTFE") or an ultra-high molecular weight ("UHMW") polyethylene, with a hard abrasive, such as, for example, silica or diamond, impregnated into the material. While the above description focuses on use of a plurality of cutter bodies, the disclosure additionally contemplates cutting systems using a single cutter body having the characteristics described above, such as, for example, the second cutter body 324 having the rough surface 330 and the smooth surface 332.

Figure 4:
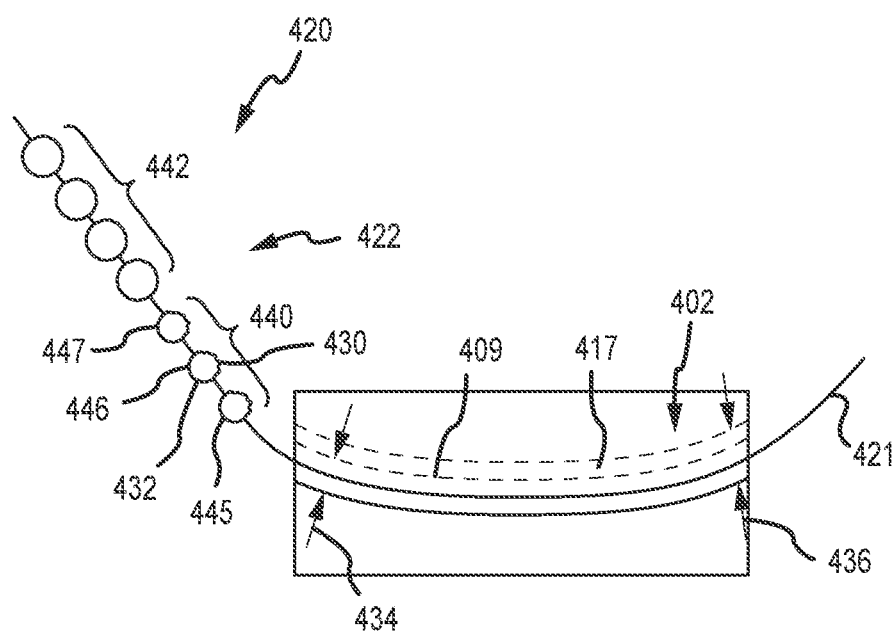
FIG. 4 illustrates a cutting system configured to smooth a surface of a channel exhibiting distortions or surface roughness, in accordance with various embodiments.

Referring now to FIG. 4, a cutting system 420, configured to remove excess material 417 along a length of a channel 402, such as, for example, the excess material 217 along the length of the channel 202 described above with reference to FIGS. 2A-2C, is illustrated. In various embodiments, the cutting system 420 includes a cutting component, such as, for example, a plurality of cutter bodies 422, including, for example, a first plurality of cutter bodies 440 and a second plurality of cutter bodies 442. The cutting system 420 may include additional pluralities of cutter bodies, such as, for example, a third plurality of cutter bodies without loss of generality. In various embodiments, each of the first plurality of cutter bodies 440, such as, for example, a first cutter body 445, a second cutter body, 446 and a third cutter body 447, may be characterized as comprising a rough surface 430 (or an abrasive surface) and a smooth surface 432, similar to the rough surface 330 and the smooth surface 332 described above with reference to FIG. 3B. Similar to the above description with reference to FIGS. 3A and 3B, each cutter body within the first plurality of cutter bodies 440 is characterized by a cross sectional dimension $D_{CS}$ that may be defined as an average diameter $D_{avg}$ that accounts for variations in diameter D across the rough surface 430 and the diameter D across the smooth surface 432 that define the cutter body. As note above, each cutter body may take various shapes, such as, for example, spherical, spheroidal, cylindrical, an axisymmetric body of revolution or the like.

Rather than a progression of cutter bodies characterized by progressively larger diameters, as illustrated in FIG. 3A, the disclosure additionally contemplates progressive pluralities of cutter bodies characterized by progressively larger diameters, as illustrated in FIG. 4. For example, each of the first plurality of cutter bodies 440 may be characterized by a diameter $D_1$ and each of the second plurality of cutter bodies 442 may be characterized by a diameter $D_2$, such that $D_1<D_2$, where $D_i$ is defined using the various techniques described above. In various embodiments, $D_1$ is selected to begin cutting into a down-facing surface 409 that remains following an additive manufacturing process and that is characterized by a first characteristic distance 434 (which may characterize a tear drop shape, a circular shape or some other shape having a down-facing surface), and $D_2$ is selected to bring the diameter of the channel 402 that results from the cutting process to its intended value 436 following the cutting process. Generally speaking, in various embodiments, the rough surface 330 is used to cut away the excess material 417 along the down-facing surface 409 while the smooth surface 432 is used to guide each cutter body along the corresponding up-facing surface. In various embodiments, each of the progressively larger pluralities of cutter bodies may define a difference in diameter, $\Delta D_i = D_i - D_{i-1}$. Depending upon the application, $\Delta D_i$ or $D_i$ may take on any appropriate value, which, in various embodiments, may range from values on the order of a few micrometers or less to several hundred millimeters or more. In various embodiments, a cable 421 connects each of the cutter bodies among the pluralities of cutter bodies and is configured to pull the cutter bodies (or the pluralities of cutter bodies) through the channel 402 during the cutting process.

Figure 5A:
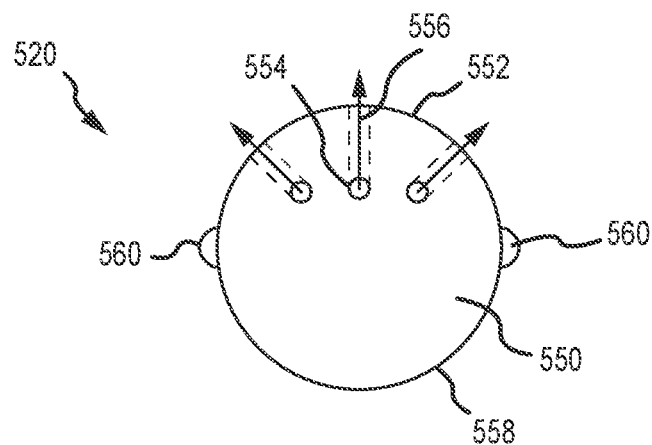
FIGS. 5A and 5B illustrate a cutting system configured to smooth a surface of a channel exhibiting distortions or surface roughness, in accordance with various embodiments.
Figure 5B:
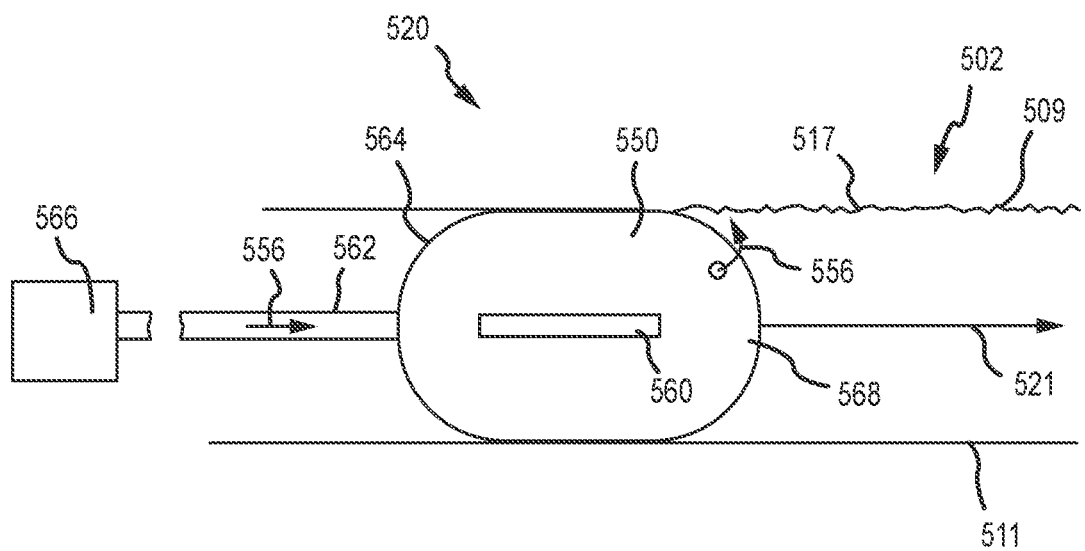

Referring now to FIGS. 5A and 5B, a cutting system 520, configured to remove excess material 517 along a length of a channel 502, such as, for example, the excess material 217 along the length of the channel 202 described above with reference to FIGS. 2A-2C, is illustrated. In various embodiments, the cutting system 520 includes a cutting component, such as, for example, a cutter body 550 (or a plurality of such cutter bodies). The cutter body 550 includes an upper surface 552 (or a first surface or a first surface portion) having an abrasive media supply orifice 554 (or a plurality of such orifices) extending through the upper surface 552 and configured to supply a flow of abrasive media 556 to abrade or otherwise remove the excess material 517 residing on a down-facing surface 509 following an additive manufacturing process of a component including the channel 502. In various embodiments, the cutter body 550 includes a lower surface 558 (or a second surface or a second surface portion) configured to be guided through the channel 502 along an up-facing surface 511. In various embodiments, the cutting system 520 includes a seal 560 that extends radially outward from a portion of the cutter body 550 between the upper surface 552 and the lower surface 558. The seal 560 is configured to slide along an interior surface of the channel 502 between the down-facing surface 509 and the up-facing surface 511 and to prevent the abrasive media 556 from flowing into a region bounded by the seal 560 and the lower surface 558 of the cutter body 550 so as not to abrade the up-facing surface 511 of the channel 502.

In various embodiments, a media supply tube 562 is connected to an upstream end 564 of the cutter body 550 and configured to supply the abrasive media 516 to the cutter body 550 via a pump 566. In various embodiments, a cable 521 is connected to a downstream end 568 of the cutter body 550 and configured to pull the cutter body 550 through the channel 502 during the cutting process. While the cutter body 550 is depicted in FIGS. 5A and 5B as a single cutter body, the disclosure contemplates a plurality of such cutter bodies, connected together by the cable 521 or the media supply tube 562, with each such cutter body configured to provide the abrasive media 556 to the down-facing surface 509. Further, various embodiments of the cutting system 520 may include cutter bodies configured to supply the abrasive media 556, as described above, but where the cutter bodies have progressively larger diameters, as described above with reference to FIGS. 3A and 3B, or include pluralities of cutter bodies having progressively larger diameters, as described above with reference to FIG. 4. In addition, in various embodiments, the cutter body 550, or one or more members of the plurality or pluralities of cutter bodies, may include a rough surface and a smooth surface, as also described above with reference to FIGS. 3A and 3B and FIG. 4.

Figure 6A:
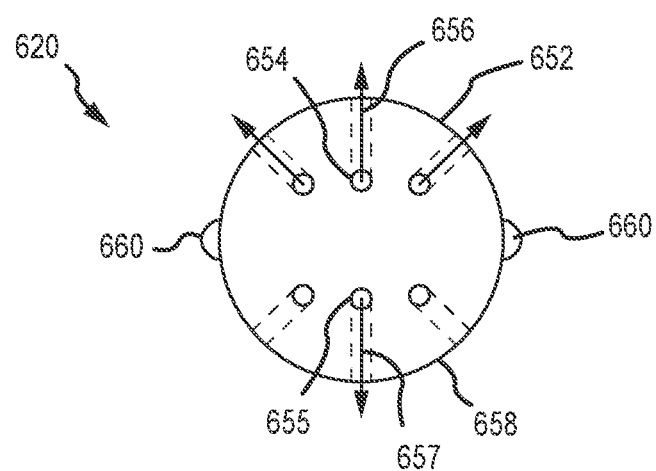
FIGS. 6A and 6B illustrate a cutting system configured to smooth a surface of a channel exhibiting distortions or surface roughness, in accordance with various embodiments.
Figure 6B:
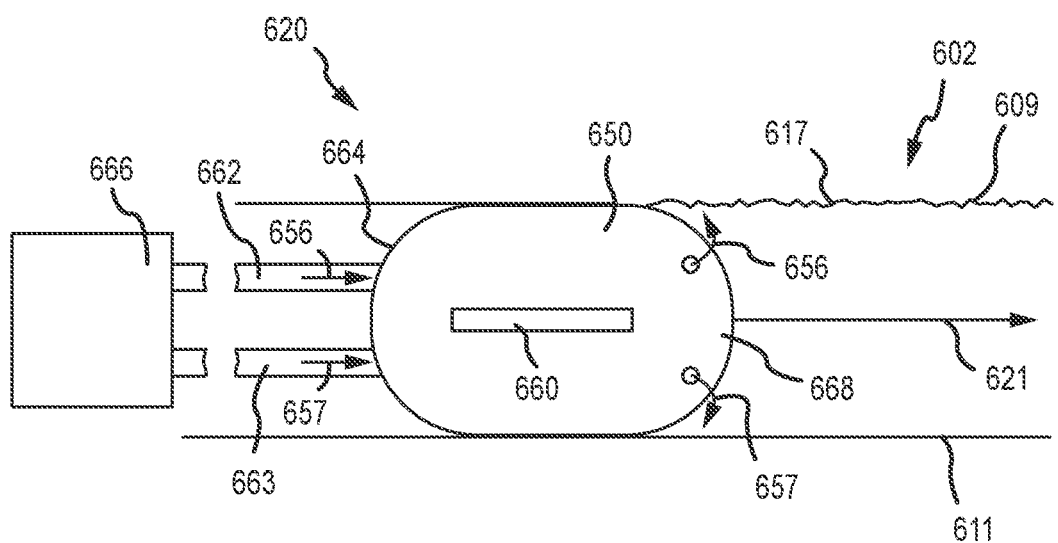

Referring now to FIGS. 6A and 6B, a cutting system 620, configured to remove excess material 617 along a length of a channel 602, such as, for example, the excess material 217 along the length of the channel 202 described above with reference to FIGS. 2A-2C, is illustrated. In various embodiments, the cutting system 620 includes a cutting component, such as, for example, a cutter body 650 (or a plurality of such cutter bodies). The cutter body 650 includes an upper surface 652 (or a first surface) having an abrasive media supply orifice 654 (or a plurality of such orifices) extending through the upper surface 652 and configured to supply a flow of abrasive media 656 to abrade or otherwise remove the excess material 617 residing on a down-facing surface 609 following an additive manufacturing process of a component including the channel 602. In various embodiments, the cutter body 650 includes a lower surface 658 configured to be guided through the channel 602 along an up-facing surface 611. The cutter body 650 includes a lubricant supply orifice 655 (or a plurality of such orifices) extending through the lower surface 658 and configured to supply a flow of lubricant 657 to lubricate the lower surface 658 when sliding along the up-facing surface 611 of the channel 602. In various embodiments, the cutting system 620 includes a seal 660 that extends radially outward from a portion of the cutter body 650 between the upper surface 652 and the lower surface 658. The seal 660 is configured to slide along an interior surface of the channel 602 between the down-facing surface 609 and the up-facing surface 611 and to prevent the abrasive media 656 from flowing into a region bounded by the seal 660 and the lower surface 658 of the cutter body 650 so as not to abrade the up-facing surface 611 of the channel 602 or mix with the lubricant 657.

In various embodiments, a media supply tube 662 is connected to an upstream end 664 of the cutter body 650 and configured to supply the abrasive media 656 to the cutter body 650 via a pump 666. In various embodiments, a lubricant supply tube 663 is also connected to the upstream end 664 of the cutter body 650 and configured to supply the lubricant 657 to the cutter body 650 via the pump 666. In various embodiments, a cable 621 is connected to a downstream end 668 of the cutter body 650 and configured to pull the cutter body 650 through the channel 602 during the cutting process. While the cutter body 650 is depicted in FIGS. 6A and 6B as a single cutter body, the disclosure contemplates a plurality of such cutter bodies, connected together by one or more of the cable 621, the media supply tube 662 or the lubricant supply tube 663, with each such cutter body configured to provide the abrasive media 656 to the down-facing surface 609 and the lubricant 657 to the up-facing surface 611. Further, various embodiments of the cutting system 620 may include cutter bodies configured to supply one or both of the abrasive media 656 and the lubricant 657, where the cutter bodies have progressively larger diameters, as described above with reference to FIGS. 3A and 3B, or include pluralities of cutter bodies having progressively larger diameters, as described above with reference to FIG. 4. In addition, in various embodiments, the cutter body 650, or one or more members of the plurality or pluralities of cutter bodies, may include a rough surface and a smooth surface, as also described above with reference to FIGS. 3A and 3B and FIG. 4

Figure 7:
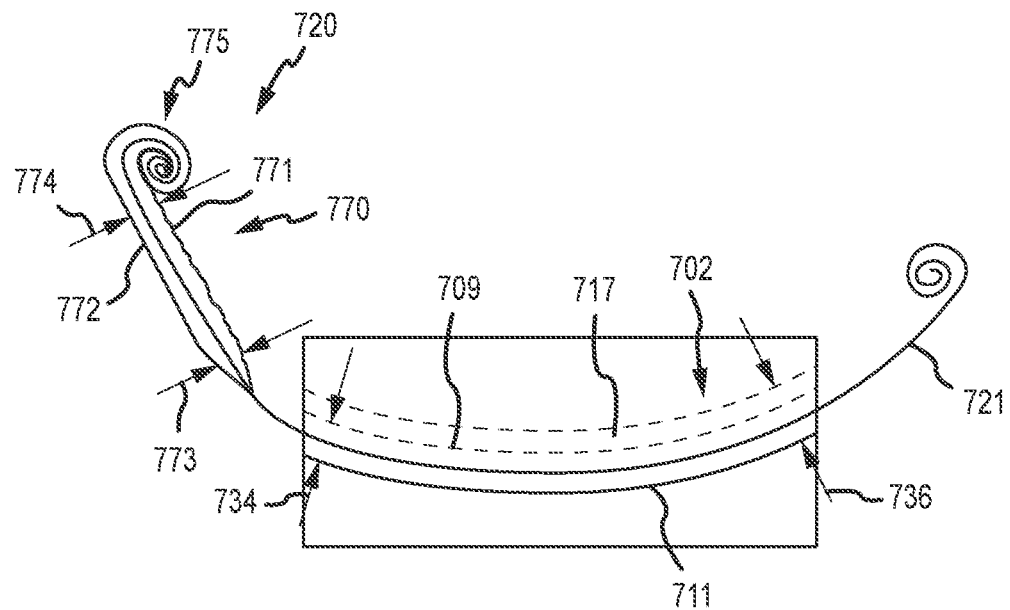
FIG. 7 illustrates a cutting system configured to smooth a surface of a channel exhibiting distortions or surface roughness, in accordance with various embodiments.

Referring now to FIG. 7, a cutting system 720, configured to remove excess material 717 along a length of a channel 702, such as, for example, the excess material 217 along the length of the channel 202 described above with reference to FIGS. 2A-2C, is illustrated. In various embodiments, the cutting system 720 includes a cutting component, such as, for example, a tube 770 (which may have a solid or a hollow interior) having an upper surface 771 that is abrasive and a lower surface 772 that is smooth. In various embodiments, the tube 770 is defined by a first diameter 773 that is selected to begin cutting into a down-facing surface 709 that remains following an additive manufacturing process and that is characterized by a first characteristic distance 734 (which may characterize a tear drop shape, a circular shape or some other shape having a down-facing surface). The lower surface 772 is configured to be guided through the channel 702 along an up-facing surface 711. In various embodiments, the tube 770 is also defined by a second diameter 774 that is selected to bring the diameter of the channel 702 that results from the cutting process to its intended value 736 following the cutting process. In various embodiments, the tube 770 may comprise a polymeric material that is disposed in a roll 775 prior to the cutting process and configured to be drawn through the channel 702 by a cable 721.

Figure 8:
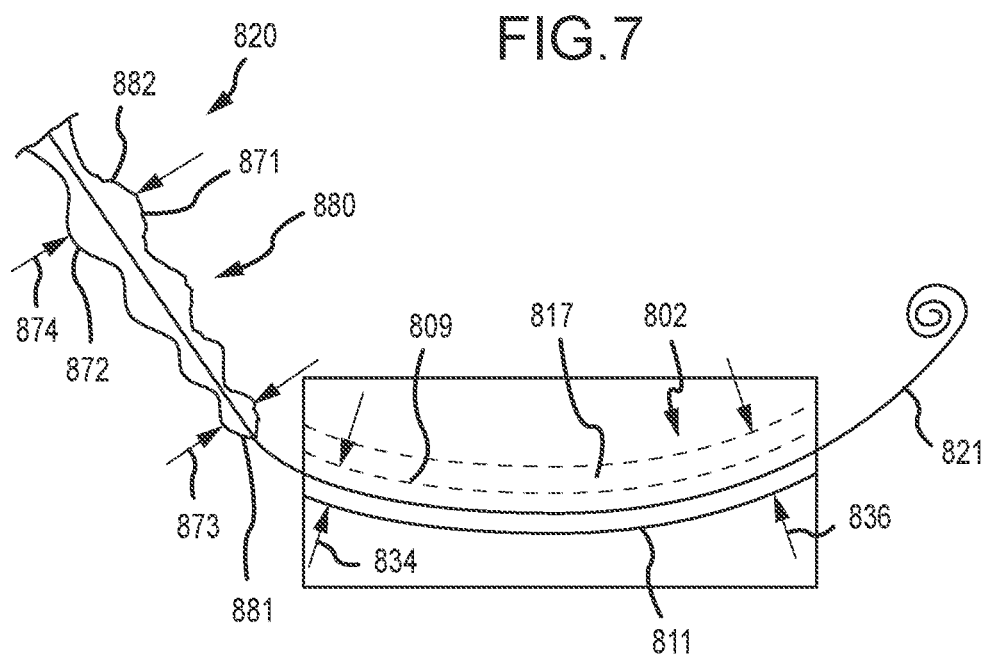
FIG. 8 illustrates a cutting system configured to smooth a surface of a channel exhibiting distortions or surface roughness, in accordance with various embodiments.

Referring now to FIG. 8, a cutting system 820, configured to remove excess material 817 along a length of a channel 802, such as, for example, the excess material 217 along the length of the channel 202 described above with reference to FIGS. 2A-2C, is illustrated. In various embodiments, the cutting system 820 includes a cutting component, such as, for example, a pulsating tube 880 having an upper surface 871 that is abrasive and a lower surface 872 that is smooth. In various embodiments, the pulsating tube 880 is defined by a first lobe 881 having a first diameter 873 that is selected to begin cutting into a down-facing surface 809 that remains following an additive manufacturing process and that is characterized by a first characteristic distance 834 (which may characterize a tear drop shape, a circular shape or some other shape having a down-facing surface). The lower surface 872 is smooth and configured to be guided through the channel 802 along an up-facing surface 811. In various embodiments, the pulsating tube 880 is also defined by an Nth lobe 882 having an Nth diameter 874 that is selected to bring the diameter of the channel 802 that results from the cutting process to its intended value 836 following the cutting process. In various embodiments, a plurality of lobes are disposed between the first lobe 881 and the Nth lobe 882, with each lobe having a progressively larger diameter between the first diameter 873 and the Nth diameter 874; and, in various embodiments, each of the plurality of lobes may have the same diameter. In various embodiments, the pulsating tube 880 may comprise a polymeric material configured to be drawn through the channel 802 by a cable 821.

Figures 9A, 9B:
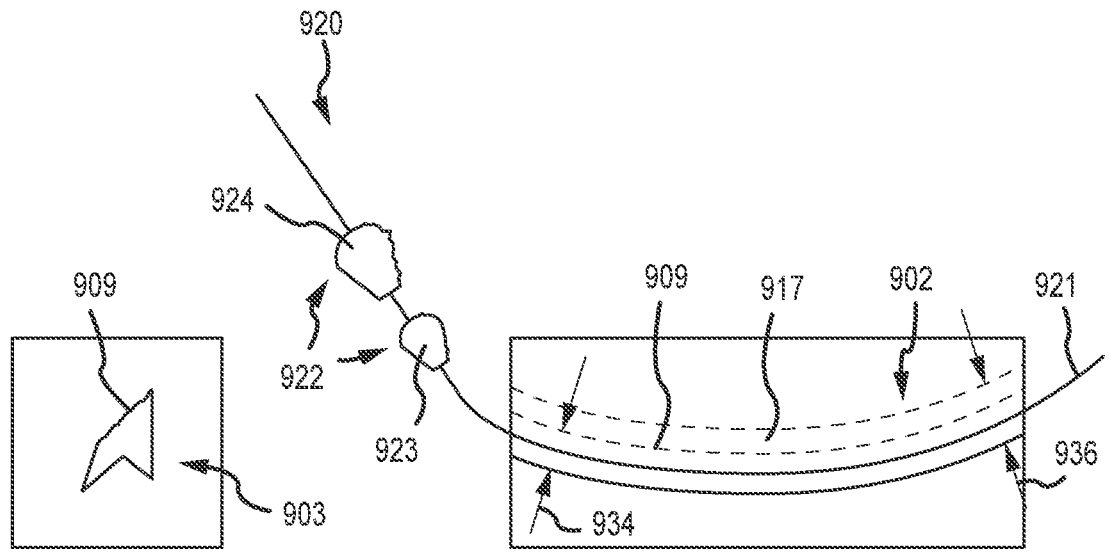
FIGS. 9A and 9B illustrate a cutting system configured to smooth a surface of a channel exhibiting distortions or surface roughness, in accordance with various embodiments.

Referring now to FIGS. 9A and 9B, a cutting system 920, configured to remove excess material 917 along a length of a channel 902 having an irregular cross sectional geometry 903 is illustrated. In various embodiments, the cutting system 920 includes a cutting component, such as, for example, a plurality of cutters 922, including, for example, a first cutter 923 and a second cutter 924, though the disclosure contemplates N cutters, where N is greater than or equal to one. Each of the plurality of cutters 922 is characterized by a progressively larger cross sectional geometry that mirrors the irregular cross sectional geometry 903 of the channel 902 following cutting of a down-facing surface 909 that remains following an additive manufacturing process. In various embodiments, the plurality of cutters 922 defaults to the plurality of cutter bodies 322 described above with reference to FIGS. 3A and 3B or the first plurality of cutter bodies 440 and the second plurality of cutter bodies 442 described above with reference to FIG. 4, where the channel 902 is defined by a circular cross sectional geometry. The description provided with reference to FIGS. 3A and 3B and FIG. 4 is thus equally applicable to the cutting system 920, excepting the cutters described in the cutting system 920 are generally considered non-circular with a non-circular cross section.

Figures 10A, 10B:
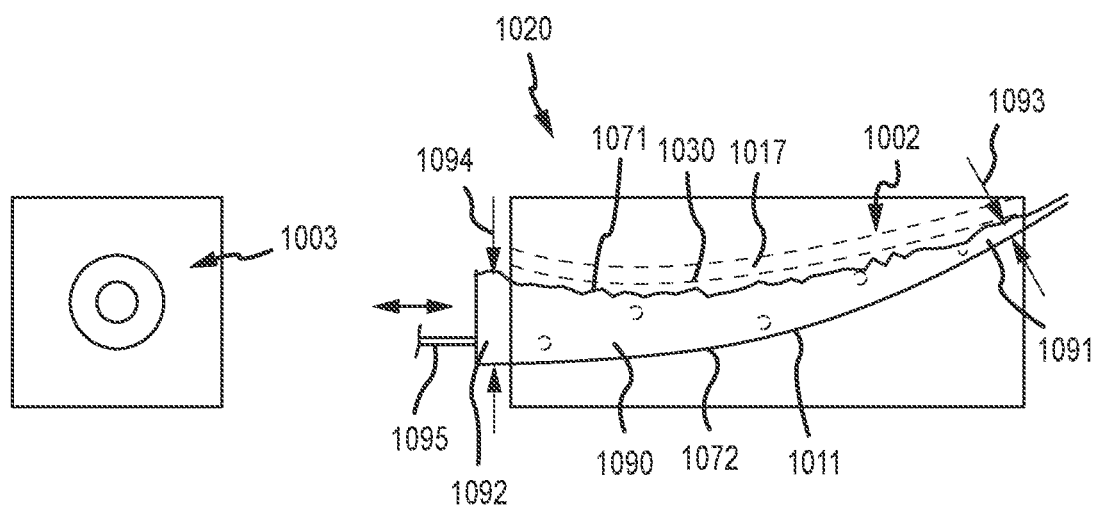
FIGS. 10A and 10B illustrate a cutting system configured to smooth a surface of a channel exhibiting distortions or surface roughness, in accordance with various embodiments.

Referring now to FIGS. 10A and 10B, a cutting system 1020, configured to remove excess material 1017 along a length of a channel 1002 having a cross sectional geometry 1003 with a varying characteristic dimension (e.g., diameter) along the length of the channel 1002, is illustrated. In various embodiments, the cutting system 1020 includes a cutting component, such as, for example, a tapered cutter 1090, including, for example, a first cutter end 1091 having a first cutter end diameter 1093 and a second cutter end 1092 having a second cutter end diameter 1094, where the second cutter end diameter 1094 is greater than the first cutter end diameter 1093. Similar to the foregoing described embodiments, the tapered cutter 1090 includes an upper surface 1071 that is abrasive and a lower surface 1072 that is smooth. The upper surface 1071 is configured to abrade or otherwise remove the excess material 1017 residing on a rough surface 1030 (e.g., a down-facing surface) following an additive manufacturing process of a component including the channel 1002, while the lower surface 1072 is configured to be guided through the channel 1002 along an up-facing surface 1011. In various embodiments, the tapered cutter 1090 is configured to reciprocate back and forth along an axis of the channel 1002 by a reciprocating arm 1095 connected to a reciprocating suitable actuator. In various embodiments, the tapered cutter 1090 comprises an abrasion resistant material having a degree of compliance, such as, for example, polytetrafluoroethylene ("PTFE") or an ultra-high molecular weight ("UHMW") polyethylene, with a hard abrasive, such as, for example, silica or diamond, impregnated into the material.

Figure 11:
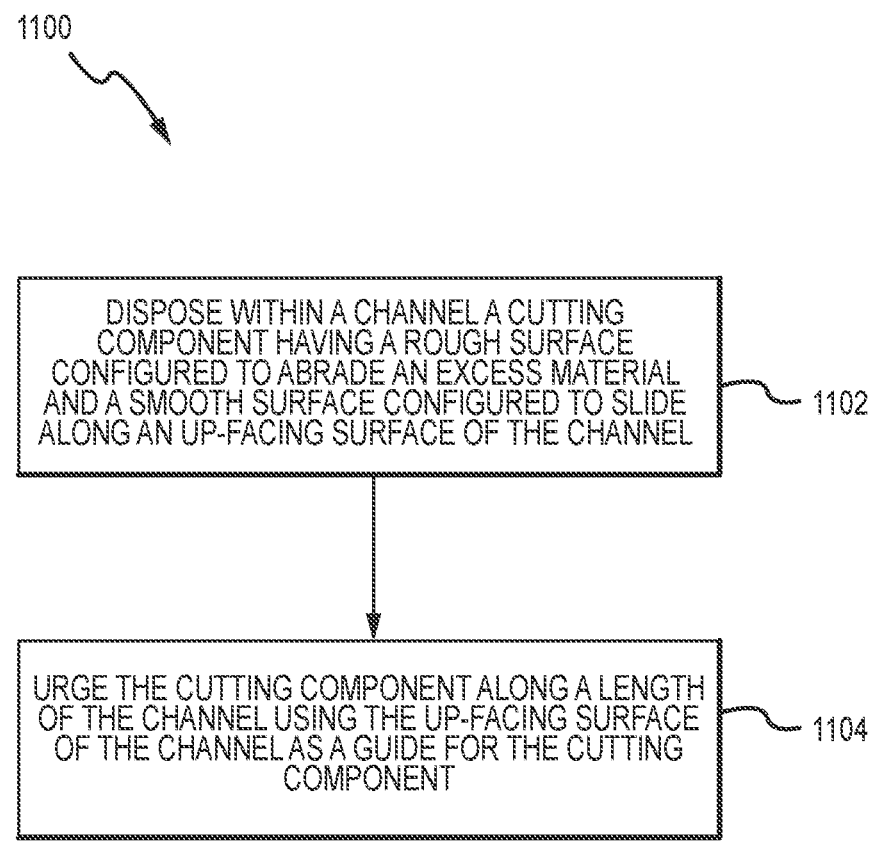
FIG. 11 is a flow chart depicting various steps of a method configured to smooth distortions or surface roughness of an internal channel of an additively manufactured component, in accordance with various embodiments.

Referring now to FIG. 11, a method 1100 of removing excess material along a down-facing surface of a channel constructed using an additive manufacturing process is described. In various embodiments, a first step 1102 includes disposing within the channel a cutting component having a rough surface configured to abrade the excess material and a smooth surface configured to slide along an up-facing surface of the channel. In various embodiments, a second step includes urging the cutting component along a length of the channel using the up-facing surface of the channel as a guide for the cutting component. In various embodiments, the cutting component includes a cutter body and, in various embodiments, the cutting component comprises a plurality of cutter bodies.

The foregoing disclosure provides apparatus and methods that enable greater design freedom in finishing internal passages or channels disposed within components made using additively manufacturing techniques. The apparatus and methods, in particular, facilitate enhanced uniformity and precision of the channels during finishing processes subsequent to initial fabrication of components via an additive manufacturing process. Further, and as described above, the apparatus and methods may be particularly useful in precursor steps to finishing steps where material is preferentially removed from surfaces (e.g., down-facing surfaces) within the channel.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cutting system for removing an excess material along a length of a channel constructed using an additive manufacturing process, comprising:
   a cutting component having a rough surface configured to remove the excess material along a down-facing surface of the channel resulting from the additive manufacturing process and a smooth surface configured for sliding contact with an up-facing surface of the channel resulting from the additive manufacturing process; and
   a motive component configured to urge the cutting component through the channel,
   wherein the cutting component comprises at least one of PTFE or UHMW,
   wherein the rough surface comprises at least one of silica or diamond embedded into the cutting component.

2. The cutting system of claim 1, wherein the cutting component comprises a first cutter body.

3. The cutting system of claim 2, wherein the cutting component comprises a plurality of cutter bodies, including the first cutter body, a second cutter body and a third cutter body.

4. The cutting system of claim 3, wherein the first cutter body defines a first diameter, the second cutter body defines a second diameter and the third cutter body defines a third diameter, and wherein the first diameter is less than the second diameter.

5. The cutting system of claim 4, wherein the motive component is a cable configured to draw the first cutter body, the second cutter body and the third cutter body through the channel.

6. The cutting system of claim 1, wherein the cutting component comprises a first plurality of cutter bodies defining a first diameter and a second plurality of cutter bodies defining a second diameter having a value greater than the first diameter.

7. The cutting system of claim 1, wherein the cutting component comprises a tube.

8. The cutting system of claim 7, wherein the tube comprises a plurality of lobes.

9. The cutting system of claim 1, wherein the cutting component comprises a cutter body having a non-circular cross section.

10. A cutting system for removing an excess material along a length of a channel constructed using an additive manufacturing process, comprising:
    a cutting component having a first means configured to remove the excess material along a down-facing surface of the channel resulting from the additive manufacturing process and a second means configured for sliding contact of the cutting component with an up-facing surface of the channel resulting from the additive manufacturing process; and a motive component configured to urge the cutting component through the channel,
    wherein the second means comprises a smooth surface comprising at least one of PFTE or UHMW,
    wherein the first means comprises a rough surface comprising at least one of silica or diamond embedded into the cutting component.

11. The cutting system of claim 10, wherein the rough surface is configured to remove the excess material and the smooth surface is configured to slide along the up-facing surface of the channel.

12. The cutting system of claim 11, wherein the cutting component includes a cutter body.

13. The cutting system of claim 12, wherein the cutting component includes a plurality of cutter bodies.

14. The cutting system of claim 10, wherein the first means includes an abrasive media supply orifice extending through a first surface of a cutter body and connected to a media supply tube configured to supply an abrasive media.

15. The cutting system of claim 14, wherein the second means includes a lubricant supply orifice extending through a second surface of the cutter body and connected to a lubricant supply tube.

16. The cutting system of claim 15, comprising a seal configured to slide along an interior surface of the channel between the down-facing surface and the up-facing surface to prevent the abrasive media from flowing into a region bounded by the seal and the second surface of the cutter body.

\* \* \* \* \*